United States Patent
Golan et al.

(10) Patent No.: US 9,245,276 B2
(45) Date of Patent: Jan. 26, 2016

(54) TIME-IN-STORE ESTIMATION USING FACIAL RECOGNITION

(71) Applicant: Verint Systems Ltd., Herzilya Pituach (IL)

(72) Inventors: Oren Golan, Or-Yehuda (IL); Gadi Zimerman, Hod-Hasharon (IL); Zvi Figov, Modiin (IL); Ofer Waisman, Herzilya Pituach (IL); Elad Falckovitch, Herzilya Pituach (IL); Doron Yankovitch, Herzilya Pituach (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 62 days.

(21) Appl. No.: 14/104,099

(22) Filed: Dec. 12, 2013

(65) Prior Publication Data
US 2014/0161316 A1 Jun. 12, 2014

Related U.S. Application Data

(60) Provisional application No. 61/736,437, filed on Dec. 12, 2012.

(51) Int. Cl.
*G06K 9/00* (2006.01)
*G06Q 30/02* (2012.01)
*H04N 5/225* (2006.01)

(52) U.S. Cl.
CPC ........ *G06Q 30/0201* (2013.01); *G06K 9/00295* (2013.01); *G06K 9/00771* (2013.01)

(58) Field of Classification Search
CPC .................. G06K 9/00; G06Q 30/00
USPC .................. 382/103, 107, 115–118, 236; 348/169–172, 352
See application file for complete search history.

(56) References Cited

U.S. PATENT DOCUMENTS

| | | | |
|---|---|---|---|
| 9,092,663 B2 * | 7/2015 | Kono | G07C 9/00158 |
| 2003/0083052 A1 * | 5/2003 | Hosaka | 455/414 |
| 2006/0204050 A1 * | 9/2006 | Takizawa | 382/115 |

* cited by examiner

*Primary Examiner* — Abolfazl Tabatabai
(74) *Attorney, Agent, or Firm* — Meunier Carlin & Curfman

(57) ABSTRACT

A method of monitoring the amount of time spent in a specified area by an individual comprises employing a first camera to automatically create one or more entrance images, each entrance image containing a face of an entering individual that passes a first location, and storing each entrance image in a database along with a corresponding entrance time that the entering individual passed the entrance location. A second camera is also employed to automatically create an exit image of a face of an exiting individual that passes a second location, and the exit image is recorded along with the corresponding exit time that the exiting individual passed the exit location. The exit image is then compared to the entrance images in the database to identify a matching entrance image containing the same face as the exit image. A stay time is then determined for the exiting individual by determining the difference between the entrance time corresponding to the matching entrance image and the exit time.

16 Claims, 4 Drawing Sheets

TIME-IN-STORE ESTIMATION USING FACIAL RECOGNITION

CROSS-REFERENCE TO RELATED APPLICATION

The present application claims priority of U.S. Provisional Patent Application Nos. 61/736,437, filed on Dec. 12, 2012, the contents of which is hereby incorporated herein by reference in its entirety.

FIELD

The present disclosure relates to a method and system for determining and analyzing flow patterns of individuals in a specified area, and more specifically to systems and methods of determining and analyzing amounts of time spent in a specified area by individuals, such as time spent by customers in a store.

BACKGROUND

Facial detection and facial recognition algorithms exist and are available on the market. Currently, these algorithms (especially facial recognition algorithms) still face accuracy challenges when applied in certain settings and configurations. For example, facial detection and recognition algorithms tend to be highly inaccurate at identifying and recognizing facial profiles, or even facial images that are directed more than 20° away from the image source. Additionally, facial detection and recognition algorithms tend to have difficulty accurately detecting and recognizing faces in poor lighting or when objects partially cover the subject's face, such as for subjects wearing sunglasses and/or having long hair. Facial recognition algorithms also tend to miss or misidentify certain facial features in an image, thus making it difficult to accurately compare and match two different facial images. For example, recognition is sensitive to temporal changes that an individual may have, such as changing a hair style or growing a beard. Recognition is also sensitive to the amount of possible matches in a database, which may increase the possibility of a mismatch.

SUMMARY

The present disclosure stems from the inventors research and development of systems and methods for employing facial recognition and facial detection algorithms for determining the amount of time that an individual, such as a customer, spends in a particular location, such as inside a store. In addition to measuring a customer's stay time in a location, such as a time-in-store, the method and systems developed by the inventors and disclosed herein can be applied to any situation requiring the measurement and flow monitoring of the amount of time that one or more individuals spend in a specified area. For example, the disclosed stay time monitoring system may be used to monitor and analyze the amount of time that individuals spend in a particular section of a store, such as how long individuals spend in the checkout line. The disclosed methods and systems also relate to analyzing data relating to such time spent in a specified area to provide useful analytic results for a user. For example, the present inventors recognize that measuring and analyzing the amount of time that customers spend in a particular store can provide value in at least two major respects: 1) time-in-store data can be correlated to sales data to provide information about how to increase sales; and 2) measuring a customer's time-in-store leads to better predictions of customers' flow and can allow a store to better service a customer leading to higher customer satisfaction.

The present inventors recognize that facial detection and recognition algorithms could be used, despite their lack of reliability, to create useful data regarding amounts of time spent by individuals in a specified area, such as time-in-store data. For example, the inventors recognize that with a large statistical pool garnered by a large traffic flow through a particular area, significant and useful data can be garnered even if a stay time, e.g., a time-in-store, can only be identified for a relatively small percentage of individuals passing through the specified area. In other words, even if only a fraction of facial matches can be determined between images taken at an entrance location and images taken at an exit location, that detected fraction can be representative of the larger flow pattern and the amount of time spent in the specified area by individuals. Since the unmatched images are essentially random with respect to the amount of time spent in the store, the detected percentage can serve as a representative sample to the amount of time spent in the specified area, such as a store, by the larger population.

In one embodiment, a method of monitoring the amount of time spent in a specified area by an individual includes receiving a plurality entrance images, each entrance image containing a face of an entering individual that passes a first location, and then storing each entrance image in the database along with a corresponding entrance image time that the entering individuals pass the entrance locations. An exit image is also received of a face of an exiting individual that passes a second location, and the exit image is stored along with the corresponding exit time that the exiting individual passed the exit location. The method further comprises comparing the exit image to the entrance images in the database and identifying a matching entrance image containing the same face as the exit image. A stay time is then determined for the exiting individual by determining the difference between the entrance time corresponding to the matching entrance image and the exit time.

A system for monitoring time spent in a location by an individual includes a first camera positioned to record images of individuals passing a first location and a first image processing module configured to process the recorded images from the first camera using a face detection algorithm to detect faces within the recorded image, create an entrance image of each detected face, and determine an entrance time for each entrance image. The entrance time is the time that the individuals in the entrance image pass the first location. A database is configured to receive and store the entrance image and the corresponding entrance time. The system also includes a second camera positioned to record individuals passing a second location and a second image processing module configured to process the recorded images from the second camera using a face detection algorithm to detect faces within the recorded image, create an exit image of each detected face, and determine an exit time for each exit image. The exit time is the time that the individual in the exit image passes the second location. An image matching module is configured to compare the exit image to the entrance images in the database of entrance images using a facial recognition algorithm to identify a matching entrance image containing the same face as the exit image, and a stay time calculator module configured to calculate the stay time for the exiting individual by determining the difference between entrance time corresponding to the matching entrance image and the exit time.

In an exemplary embodiment, a system for monitoring time spent in a location may be utilized in a store, wherein the first camera is positioned to record individuals entering the store and a second camera is positioned to record individuals exiting the store. In such an embodiment, the stay time for the exiting individual is the time that the exiting individual spent in the store.

In another embodiment, a method of monitoring a time-in-store for an individual comprises recording an image of an entrance location with a first camera and recording an entrance time associated with an image of the entrance location. One or more faces in an image of the entrance location are detected using a first detection algorithm, and an entrance image is created of the one or more faces detected in the image of the entrance location. The entrance image and the entrance time are then stored together in an entrance image database. The method further includes recording an image of an exit location with a second camera and recording an exit time associated with the image of the exit location. One or more faces are detected in the image of the exit location using the face detection algorithm, and an exit image is created of the one or more faces detected in the image of the exit location. The exit image is then stored along with the exit time. The method further includes comparing the exit image to the images in the entrance image database using a facial recognition algorithm and detecting a matching entrance image, wherein the matching entrance image contains a facial match to the exit image. The stay time is then calculated by determining the difference between exit time and the entrance time associated with the matching entrance image. The system may further includes identifying the matched entrance images in the entrance image database and removing unmatched entrance images from the entrance image database that have entrance times before a predefined time period. The method may further comprise calculating stay times for multiple exit images over a predefined time period and averaging the stay times within the predefined time period to create an average stay time for the predefined time period.

Various other features, objects and advantages of the invention will be made apparent from the following description taken together with the drawings.

DETAILED DISCLOSURE

Figure 1:
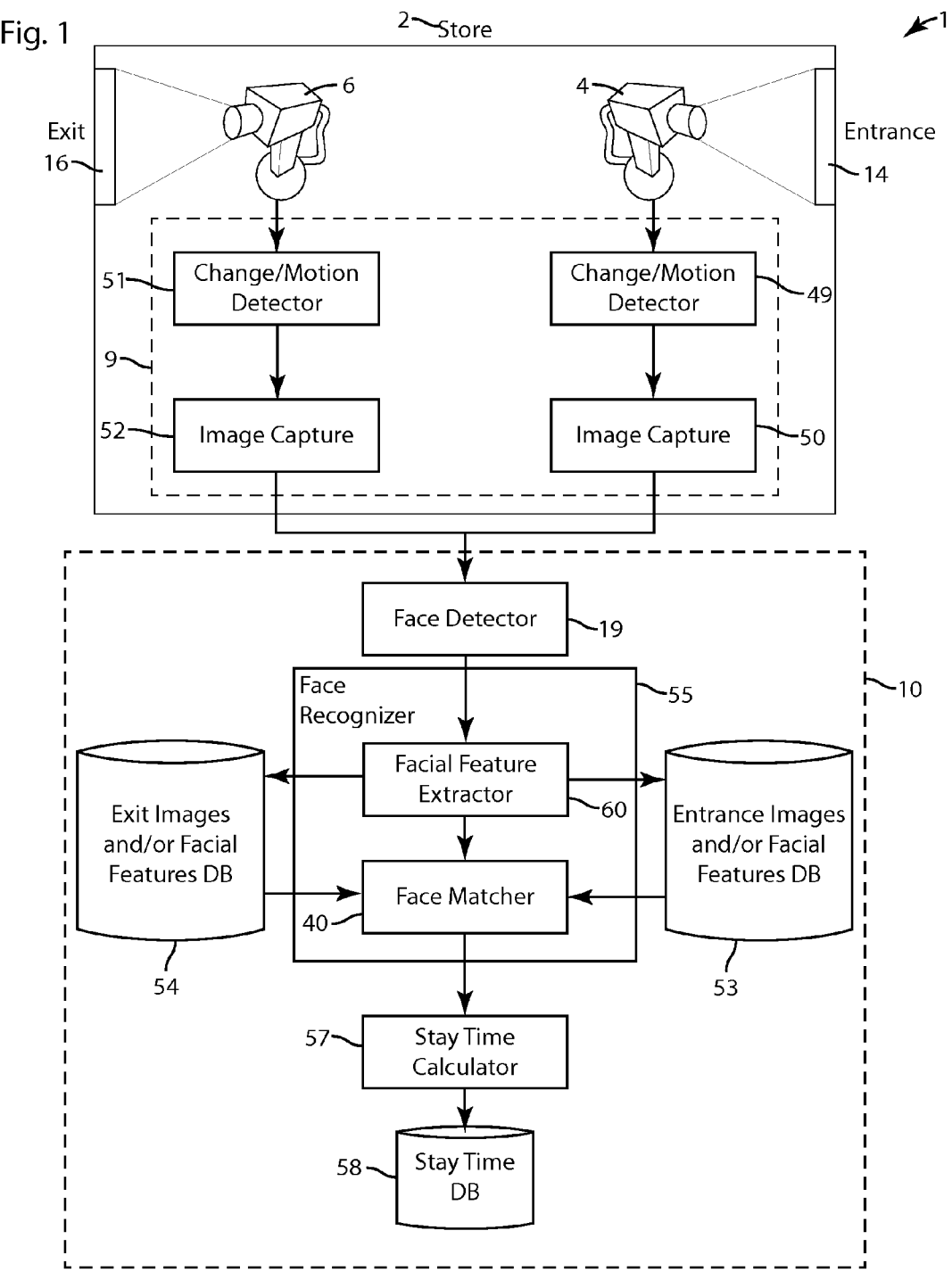
FIG. 1 is an exemplary system diagram depicting one embodiment of a stay time monitoring system.

In one example depicted in FIG. 1, a stay time monitoring system 1 includes the first camera 4 imaging an entrance location 14 and a second camera 6 imaging an exit location 16. The first camera 4 and the second camera 6 are preferably video cameras; however, a still image camera may also be used. In a preferred embodiment, the first and second cameras 4 and 6 are mounted approximately in the same horizontal plane as the faces of individuals passing the first location and/or the second location. However, systems 1 having higher or lower mounted cameras are also possible. The images are then time stamped and stored. Preferably, the first and second cameras 4 and 6 also time stamp each captured image or frame with the time of capture, and store such time stamp data embedded in or in association with the image. Alternatively, the images may be time stamped upon storage. In such an embodiment, the storage process must take place reasonably quickly after the image is captured by the camera so that the time stamp is accurate enough for the time measurement purposes disclosed herein.

The exemplary system in FIG. 1 further comprises a local processor 9 which processes image data from the cameras 4 and 6 and then transfers the image data to a central processor 10 for facial detection and recognition processing. At the local processor, the images from each camera may be processed to determine whether any change or motion is detected, which would indicate that the image from the respective camera may contain an image of one or more individuals entering or exiting the store 2. If change or motion is detected in the image from the first camera 4, then the image capture module 50 captures the image, including the time stamp data, for example by placing the image in a storage location, such as a database, and/or transmitting the image to the central processor 10. Likewise, if the change/motion detector module 51 detects any change or motion in the image from the second camera 6, then the image capture module 52 captures the image. In the depicted embodiment, the captured images, along with any associated time-stamp data, may be transferred to a central processor 10 for face detection and further processing.

In the embodiment of FIG. 1, the central processor 10 employs a face detector module 19 to process the images captured from the first camera 4 and the second camera 6. Images wherein one or more faces are detected are then transferred to a face recognizer 55, which is a face recognition algorithm or module. The face recognizer module 55 includes a facial feature extractor 60 and a face matcher 40 algorithm. The facial feature extractor 60 operates facial recognition software or algorithms to determine a facial feature descriptor for the detected face. For example, facial feature descriptors may be a vector of numbers identifying and describing facial landmarks—such as ears, eyes, pupils, mouth, nose, cheekbones, and jaw—and their relative location, position, size, and/or shape of each landmark on the subject's face. Any number of available facial identification, facial feature extraction, and/or facial recognition software products may be utilized in the stay time monitoring system 2 and the disclosed method. For example, several suitable algorithms are available on the market, including the FaceVACS™ software by Cognitec Systems GmbH, FaceSDK offered by Luxand, Inc., and FaceRecognizer by OpenCV.

The central processor 10 may be at a remote location, such as a central office or headquarters. Alternatively, the central processor 10 may be housed locally within the store 2, and may even be the same processor as the local processor 9. In embodiments where the central processor 10 is separate from the local processor 9, the processing tasks described herein can be divided up between the processors in any fashion—i.e., the separation between local and remote processing can be done between any algorithm processing stage. For example, in the embodiment depicted in FIG. 1, the division may be between change detector 51/49 and face detector 19, or between face detector 19 and face recognizer 55, between the facial feature extractor 60 and the face matcher 40, between the facial recognizer 55 and the stay time calculator 57, or between the stay time calculator 57 and the storage in the stay time database 58.

In the exemplary system depicted in FIG. 1, after the image has been processed by the face recognition module 55, the image and/or the resulting facial feature descriptor for the detected face are stored in either the exit image storage 54 or the entrance image database 53, depending on the source of the image. Images from the first camera 4 wherein faces are detected at module 19 and recognized at module 55 are transferred to the entrance image database 53. The entrance image database may index and store the image, including the time stamp data, and/or facial feature descriptor data in any number of ways. For example, the database may process and store in association with a unique index any or all of the following information: the image from the first camera 4, the time stamp data associated with the image, the data regarding all of the faces detected in that image, a thumbnail or cutout image of one particular identified face (which may or may not include a defined area surrounding the detected face, depicting the body, hair, and clothing of the individual having the detected face), and any data resulting from the facial feature extractor 60. Alternatively, the entrance image database 53 and/or the exit image storage 54 may store in association with a unique index just the facial feature descriptor and the time stamp data associated with the image from the first camera 4.

Images from the second camera 6 wherein faces are detected at module 19 and recognized at module 55 are transferred to the exit image storage 54. In another embodiment, the exit image storage 54 is the same storage database as the entrance image database 53. Ian such an embodiment, each image stored in the database may be tagged as either an entrance image or an exit image. The exit image storage may be a temporary storage, or a database similar to the entrance image database. Like the description above regarding the entrance image, the exit image can take any form, and it can be any combination of the image from the second camera 6 and the data developed by the face detector 19 and the face recognition module 55.

After each exit image is stored at 54, the face matching module 40 compares the exit image 54, or associated facial feature descriptor, to the images, or associated facial feature descriptors, in the entrance database 53. The objective of the face matching module 40 is to detect an entrance image in an entrance image database 53 that contains the face as that in the exit image. The face matching module may employ any number of facial matching methods and/or techniques for identifying a match between the exit image and any image in the entrance image database 53. In one embodiment, a match is determined when a sufficient commonality between the facial feature descriptor of the exit image and the facial feature descriptor for the entrance image. For example, sufficient commonality may be where the exit image and entrance image have at least a predefined number of facial feature descriptors in common, i.e., the images have a high visual resemblance. As facial recognition algorithms tend to be unreliable in identifying and recognizing faces, facial matching may be a matter of determining a probabilistic match. In other words, the face matching algorithm may consider two images to be a match if they have the highest commonality of any pair in the data set and the commonality is sufficient to indicate that the images are more likely to contain the same face than to contain different faces.

Once a match is determined between the exit image and the entrance image, the stay time calculator 57 calculates the stay time between when the entrance image was taken and when the exit image was taken. For example, the stay time may be calculated as the difference between the time stamp on the image captured from the first camera 4 and the time stamp on the image captured by the second camera 6. Once the stay time is determined at module 57, it is stored in the stay time database 58. The stay time database 58 may store only the entrance and exit time stamps, or it may store any amount of data associated with the entrance and exit images and/or the stay time. In one embodiment, the stay time database 58 is combined in a single database with the entrance image database 53 and/or the exit image storage 54. In such an embodiment, the single database acts as the repository for the entrance and exit images, which may include the facial detection and recognition data, along with the stay time data.

The change/motion detector algorithms 49 and 51 may employ any number of image processing methods to detect a change or motion with an image, such as a person entering the entrance area 14 or the exit area 16. For example, the change/motion detector modules 49 and 51 may each have an image of the location to which they are associated in its vacant, or empty state. For example, the change/motion detector 49 associate with the first camera 4 may have a template image of the entrance location 14 without any people, traffic, or transient foreign objects therein. That template image can be compared to every subsequent image, or frame, from the first camera 4 to determine whether a change has taken place which might indicate that a subject has entered the entrance area 14. Alternatively, each entrance image, or frame, taken by the first camera 4 can be compared to a subsequent, or later, image to determine whether a change has taken place or is in progress. In still other embodiments, the change/motion detector 49 and/or 51 may employ a physical motion sensor associated with the first and/or second cameras 4 and 6. In such an embodiment, the change/motion detector modules 49 and 51 would receive input from the motion sensor, and if motion was detected would send the image to the image capture module 50. Similarly, a detector could be mounted in association with a door at an entrance or exit location, and the associated camera could be programmed to image the corresponding entrance or exit location upon detecting the door opening.

The change/motion detectors 49 and 51 associated with each of the first camera 4 and the second camera 6 may be two separate modules, one for each camera. In such an embodiment, each camera may have a separate processor attached thereto to process the images captured by the camera. In an alternative embodiment, the cameras 4 and 6 may both be attached to a single processor, such as the local processor 9. In such an embodiment, the change/motion detectors 49 and 51 may be a single module that detects change or motion in the images of both cameras 4 and 6.

In another embodiment not specifically depicted in FIG. 1, the stay time monitoring system 1 does not have a change or motion detector module, and each image or frame from the first camera 4 and the second camera 6 is processed by a face detector algorithm, such as by detector module 19, to determine whether face is captured in the image. In such an embodiment, the camera could be programmed to angle towards and/or zoom in on the detected face so that a maximum quality image may be taken. In yet another alternative embodiment, each image or frame from the first camera 4 and the second camera 6 is processed with a person detector algorithm to detect the presence of a person in the image. Then, if a person is detected, the image may be further processed to detect, or isolate, the head of the person. Person detector algorithms are commonly used in a variety of applications. Once a person is detected, the detected person can be used to create a trajectory. Trajectories for multiple people can be used to count people entering a pre-defined region, to measure the amount of time people spend in pre-defined region, or for other applications, including but not limited to intrusion detection, traffic counts (for conversion rates), customer's waiting time\dwell time, and loitering detection. Many ways of detecting people in images are known in the art, and any such person detector algorithm may be suitable for use in such an embodiment of the method.

In such an embodiment, an entrance image or exit image, as appropriate, may be created to isolate the detected person, or even just the head portion of the image. Alternatively, the entrance or exit image may be the entire image captured by the first or second camera 4 or 6. That entrance or exit image may then be processed with a face detector module 19 to verify the presence of a face. Alternatively, the face detector module 19 could be integrated into the facial recognition module 55, and each of the entrance image and the exit image may be processed with that combined module. In still other embodiments, the images captured by the first and/or second cameras 4 and 6 can be processed directly by the face detector module 19 to continually search the images for faces. As face detection algorithms are typically data and processor intensive, such an embodiment may require substantial processing power.

The face detection module 19 may employ any algorithm to detect a human face. For example, the face detection module may employ color detection methods to detect regions which are likely to contain human skin and then focus on those regions to identify particular facial features. In one such exemplary embodiment, a skin color probability image may be generated by doing a color analysis, and the probability image then processed by performing principal components analysis thereon. In still other embodiments, images are processed by neural networks using multi-dimensional information to detect any number of qualities of an image, such as skin color and/or facial features. In one such embodiment, a model-based approach is used to match images to model face shapes and/or facial features. In still other embodiments, any combination of color and/or pattern detection may be employed to detect the face or head region of an individual in the image.

The face recognition module 55 may employ any facial recognition algorithm or technique to determine a facial feature descriptor for a detected face. For example, common facial recognition algorithms include Principal Component Analysis using eigenfaces, Linear Discriminate Analysis, Elastic Bunch Graph Matching using the Fischerface algorithm, the Hidden Markov model, the Multilinear Subspace Learning using tensor representation, and the neuronal motivated dynamic link matching algorithms. Alternatively or additionally, 3-dimensional face recognition may be employed. Such an embodiment may require special cameras equipped with 3-D sensors to capture, or image, 3-dimensional information about the imaged space—e.g. the entrance area 14 or exit area 16. This 3-D information may be utilized by the facial recognition algorithm to identify distinctive features on the surface of the face, such as the contour of the eye sockets, nose, and/or chin.

In some embodiments, the facial recognition algorithm used in module 55 may identify other features aside from facial features, such as hair color, hair shape, or length, clothing colors or designs. Such descriptors may be part of the facial feature descriptor stored as part of the entrance image or exit image. In such an embodiment, the additional feature description can aid in making a match between an exit image and an entrance image. In a preferred embodiment, the facial feature descriptor includes descriptions of features that are independent of camera distance and image size, and are relatively unsusceptible to image angle and small changes in lighting. Moreover, preferred descriptors are those that are less likely to change between the time that the entrance image is taken and the exit image is taken. For example, hair color is a useful feature descriptor that is often included in facial feature descriptors because it likely remains constant over the relevant period of time, is easily detected from multiple camera angles, and is typically identifiable despite moderate lighting changes. Another descriptor often included in a facial feature descriptor for an image is clothing color.

In the embodiment depicted in FIG. 1, the stay time monitoring system 1 employs a central processor 10 with a separate face detector module 19 and facial recognition module 55. In such an embodiment, the face detector module 19 may employ face detection softare from a different source than the software employed by the face recognition module 55. In other embodiments, however, the face detector module 19 and the face recognition module 55 may be a combined detector/recognition module that both detects the presence of a face and determines facial features descriptors for the face. In such an embodiment, the single face detector/recognition module likely employs software from a single source, or vendor. As previously described, the face detection and/or face recognition modules 19 and 55 may be utilized to continually process the images from the first and second cameras 4 and 6, thereby obviating the need for any preprocessing modules, such as the change/motion detector modules 49 and 55. Alternatively, the face detector module 19 and/or the face recognition module 55 may be employed in response to a triggering event or quality detected in the images from the first and/or second cameras. For example, as depicted in FIG. 1 and described above, the face detector module 19 and face recognizer module 55 may be employed after a change is detected in the image from the first camera 4 or the second camera 6, or when motion is detected by a motion sensor.

The face detector module 19 and the face recognition module 55 may be employed by a processor dedicated to a stay time monitoring system 1 for a single store 2. In such an embodiment, the central processor 10 may be associated with or located in the store 2. In another embodiment, the central processor 10 may be housed remotely, for example, on the cloud and all processing may take place online. Alternatively, the central processor 10 may be housed in a central office associated with multiple stores 2, and thus may receive image data from multiple entrance cameras 4 and exit cameras 6 associated with the multiple stores. If the stay time monitoring system 1 utilizes a third party face detection and/or face recognition software, centralizing the face detection and face recognition processes to the central processor can reduce the number of licenses needed with such software. In other words, rather than having to license the software to be used at multiple store locations, a license can be obtained for one, centralized location. Additionally, where applicable, such a centralized embodiment may have the added benefit of being able to perform analytics involving stay time data from multiple store locations 2. However, such benefit may also be realized in a system with a local processor by uploading or centralizing the stay time data and/or the analytics data from the individual stores into a centralized database.

The system configuration depicted in FIG. 1 is merely an exemplary embodiment of the time monitoring system, and the system could take on numerous different configurations and still be within the scope of the invention conceived of by the inventors. For example, multiple cameras may be employed at each of the entrance location and the exit location, and the output from the cameras processed by a local processor 9 and/or directly by a central processor 10. In such an embodiment, the cameras may be centrally networked and controlled such that they act in concert to monitor an area without creating redundancies. Likewise, if an area has multiple entrance and exit locations, a camera or cameras may be employed at each entrance and exit location. In another embodiment, output from the first camera 4 and the second camera 6, and any number of other cameras, may be directed to a central processor such that all image processing happens in a remote location to which the data is transferred via an internet connection or by other means. The central processor may be, for example, at a central headquarters for a particular company or at a data processing center, and image data from multiple store locations could be processed at that central processor location. Alternatively, in a different embodiment, a store 2, which may be each store location in a chain or an individual store, could have its own processor to process all image data and perform all analytics locally in each store. Likewise, other configurations which are known in the art are equally possible.

Figure 2:
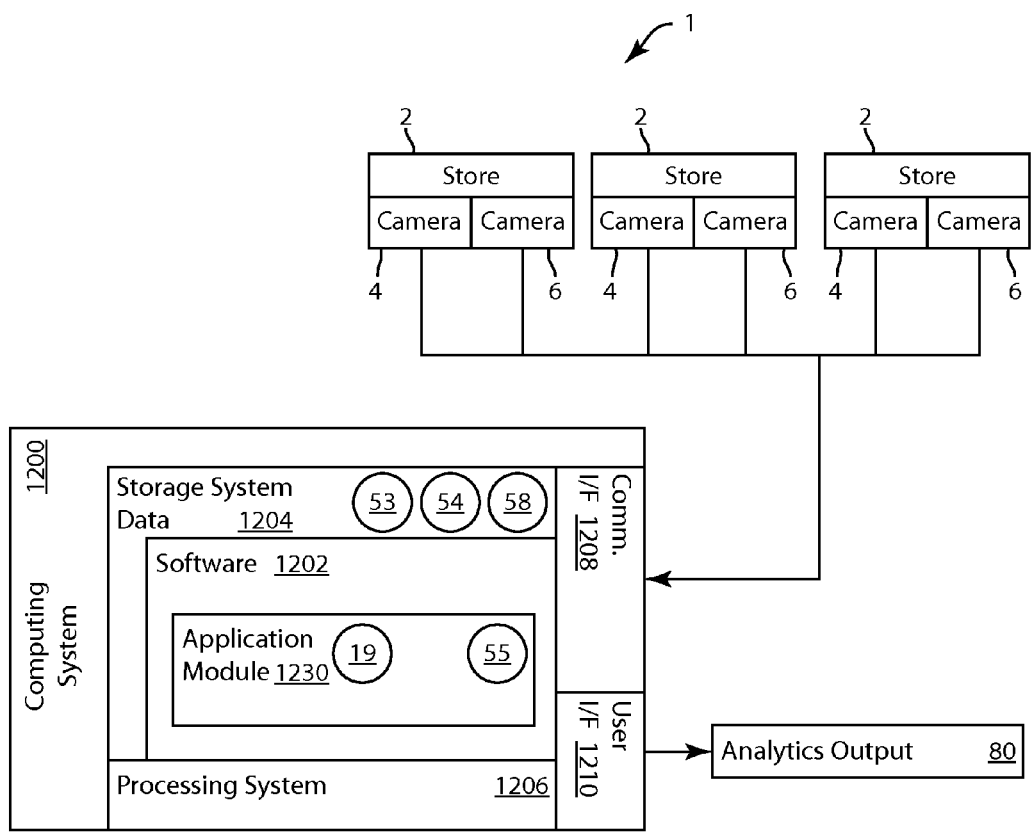
FIG. 2 is another exemplary system diagram depicting an embodiment of a stay time monitoring system.

FIG. 2 is a system diagram of an exemplary embodiment of a stay time monitoring system 1 implementing a face detection module 19, a face recognition module 55, and a face matching module 40. The computing system 1200 generally includes a processing system 1206, storage system 1204, software 1202, communication interface 1208 and a user interface 1210. The processing system 1206 loads and executes software 1202 from the storage system 1204, including a software application module 1230. When executed by the computing system 1200, software module 1230 directs the processing system 1206 to operate as described to execute the methods described herein, including execution of the face detection module 19, a face recognition module 55, and a face matching module 40. The software application module 1230 also directs the processing system 1206 to store information in the databases described herein, such as the entrance image database 53, the exit image storage location 54, and the stay time database 58. Those data bases 53, 54, and 58 comprise part of the storage system 1204.

Although the computing system 1200 as depicted in FIG. 2 includes only a few exemplary software modules in the present example, it should be understood that any number of software modules can be included, and that the operations described with respect to the three representative modules could be provided by a single module or by any number of additional modules. Similarly, while the description as provided herein refers to a computing system 1200 and a processing system 1206, it is to be recognized that implementations of such systems can be performed using one or more processors, which may be communicatively connected, and such implementations are considered to be within the scope of the description.

The processing system 1206 can comprise a microprocessor and other circuitry that retrieves and executes software 1202 from storage system 1204. Processing system 1206 can be implemented within a single processing device but can also be distributed across multiple processing devices or subsystems that cooperate in existing program instructions. Examples of processing system 1206 include general purpose central processing units, applications specific processors, and logic devices, as well as any other type of processing device, combinations of processing devices, or variations thereof.

The storage system 1204 can comprise any storage media readable by processing system 1206, and capable of storing software 1202. The storage system 1204 can include volatile and non-volatile, removable and non-removable media implemented in any method or technology for storage of information, such as computer readable instructions, data structures, program modules, or other data. Storage system 1204 can be implemented as a single storage device but may also be implemented across multiple storage devices or subsystems. Storage system 1204 can further include additional elements, such a controller capable, of communicating with the processing system 1206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 1210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 1210.

As described in further detail herein, the computing system 1200 receives image data from the first and second cameras 4 and 6 in each store 2. The image data may be in any format. In some embodiments of system, such as that depicted in FIG. 1, the image data may be or include data generated by an image processing module, such as a person detector, face detector, or face recognition module, i.e., a facial feature descriptor (represented by a vector of numbers). The image file format may exemplarily be in .jpg or .png format.

The user interface 1210 may include a display or other means of outputting information, such as analytics output 80 to a user. As is further described herein, the analytics output may include any display format or means of displaying data, such as stay time data and statistical or analytical information derived therefrom.

Figure 3:
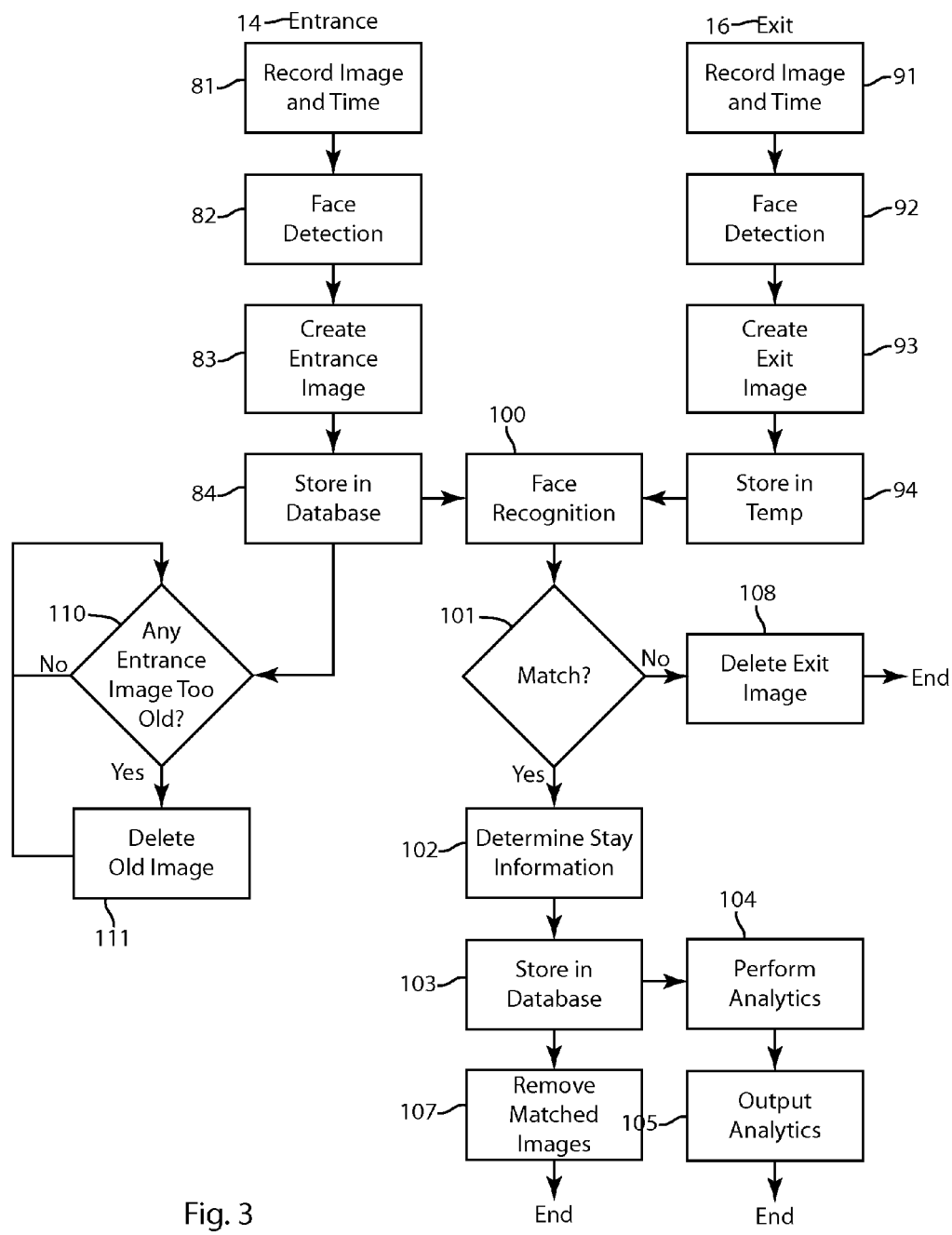
FIG. 3 is a flow diagram depicting an embodiment of a method for monitoring time spent in a specified location.

FIG. 3 represents one exemplary method of determining the amount of time spent in a specified area by an individual. Beginning at an entrance location 14, an image is recorded at step 81, such as a video recorded image. Each image is time stamped with a time of recording, and video images are continually time stamped. At step 82, the recorded images are processed with a face detection algorithm. If a face is detected, an entrance image is created at step 83. As described above, the entrance image may be created based on the detected face, and may be comprised of only the detected facial area, or may comprise any part of the image surrounding the detected face. Once the entrance image is created, it may be stored in an entrance image database at step 84.

Likewise, at an exit location 16 an image is recorded and time stamped at step 91. The image is processed using a face detection algorithm at step 92. If a face is detected, an exit image is created based on that face at step 93. In the depicted embodiment, the exit image is then stored in a temporary storage location at step 94. Next, the exit image is processed using a facial recognition algorithm at step 100, as are entrance images in the entrance image database. The exit image is compared to each of entrance images at step 101 until a match is determined—i.e., whether the exit image contains a facial match with any entrance image in the entrance image database. If a match is found between the exit image and an entrance image in the entrance image database, the matched images are passed to step 102 where stay information is determined. If no match is located, then the exit image may be deleted from the temporary storage location at step 108. In other embodiments, however, the unmatched exit image may be transferred and retained in a permanent storage location for use in future matching or analytics processes as may be described herein.

While unmatched exit images may be deleted at step 108, unmatched entrance images may also be also removed from the available entrance images in the entrance image database. At step 110, the entrance images in the entrance image database may be examined to determine whether any entrance image is too old to be a viable match. For example, at step 110, each entrance image in the entrance image database may be examined to determine whether any entrance image was taken prior to a specified time—i.e., whether the time stamp associated with the entrance image indicates that the image is older than a predefined period. For example, entrance images may be identified that are more than three hours old. In many applications, images that are more than three hours old are unlikely to produce a match because, for example in a store application, an individual is unlikely to spend more than three hours in a particular store. The old images identified at step 110 may be removed from the entrance image database at step 111. The removal of the old entrance images increases the speed and efficiency of the system because it reduces the number of entrance images that the facial recognition and match algorithms need to search. Furthermore, removal of the old entrance images can increase the accuracy of the system by removing unlikely candidates and thereby reducing the chances of a mismatch. In some embodiments, an entrance image may be removed from the database of images searched by the facial recognition algorithm, but the entrance image may be maintained in some form or location, either in the entrance image database or elsewhere.

In other embodiments, all entrance and exit images, whether matched or unmatched, may be maintained longer term in a particular database. That database can then be used in the future to match future entrance images and/or exit images taken in a particular location for a particular type of store. In such an embodiment, the stored entrance and exit images can be used to detect patterns of individuals frequenting a specified area, such as shopping frequency patterns of an individual to a particular store, or a chain of stores. For example, an entrance image can be compared to a database of images that have been stored long-term, using a facial recognition algorithm to determine whether the entrance image matches any entrance or exit image from a previous date. If a match is determined, then the dates and times of the entrance images can be compared to determine the frequency at which that individual has visited the specified area. Such information can be useful to determine, for example, the frequency or pattern at which a customer visits a particular store. Likewise, data regarding shopping frequency patterns of individuals can be used in analytics modules as described herein, such as determining average shopping frequency and patterns.

Regarding step 102, stay information is determined based on the time stamp associated with each of the exit image and the entrance image. Stay information may include the exact time that the individual entered and exited the store, as well as the duration of stay. The stay information is then stored in a database at step 103, such as a stay time database 58. In some embodiments, the stay information may also be stored along with the entrance image and/or the exit image containing the facial feature descriptor and/or the original image data from the camera. At step 107, the matched entrance image may be removed from the entrance image database and the matched exit image may be removed from its temporary storage location. As described above, such removal contributes to the efficiency and accuracy of the facial recognition and matching processes. However, as also described above, the images may be simply be removed from the images searched by the face recognition and/or match algorithms for calculating stay time, but may be otherwise retained for later matching and/or analytics processes.

At step 104, analytics are performed on the stay information in the database, or some portion thereof. For example, an average stay time may be determined for all entrance and exit images occurring within a specified period. For example, an average stay time may be determined based on individuals exiting the store between 9:00 and 10:00, 10:00 and 11:00, 11:00 and 12:00, etc. Equally, the average stay times can be calculated and associated with the entrance times, rather than the exit times. Such information can be useful for determining traffic and average shopping habits of individuals throughout a particular day, week, month, etc.

Figure 4:
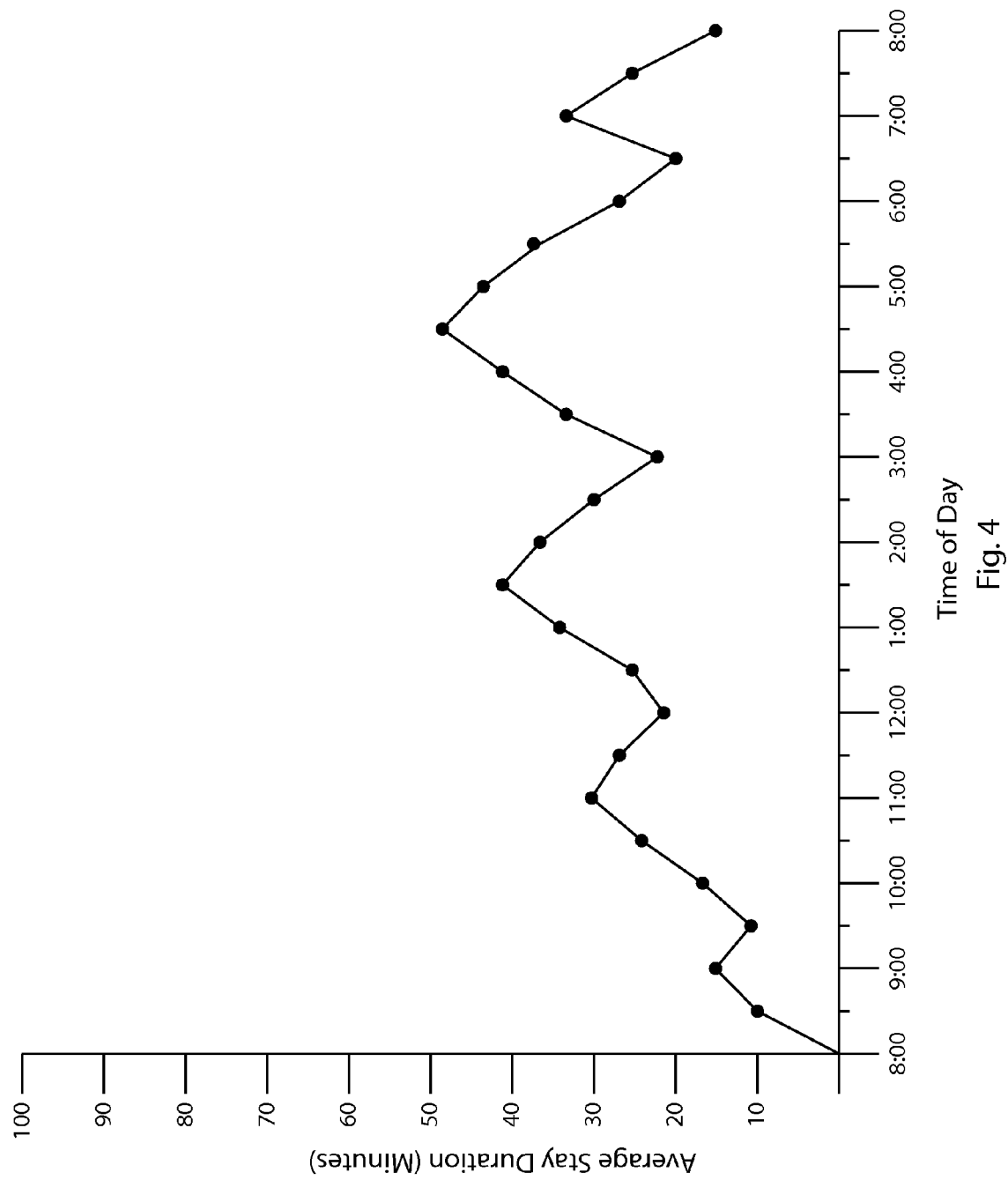
FIG. 4 is an exemplary embodiment of an analytics output of a method and system for monitoring stay time.

Analytics performed at step 104 are output at step 105. For example, the average stay time for a particular day can be output as a plot of average stay duration in minutes vs. time of day, such as the graph shown in FIG. 4. FIG. 4 demonstrates an exemplary plot of average stay duration in minutes over a period of 8 AM to 8 PM. The average stay duration in the exemplary plot is calculated every thirty minutes, for example, based on the entrance or exit time of the matched exit image. Thus, for example, the stay time associated with the matched exit images having an exit time stamp between 8:00 and 8:30 were averaged to create the data point at 8:30. The same process is repeated for the stay times for exit images between 8:30 and 9:00, and so on. Alternatively, the averages can be determined based on the entrance time of the matched images, and the plots can be displayed according to entrance times. In such an embodiment, all matched image pairs having an entrance time between 8:00 and 8:30 can be grouped together and the stay times averaged to create the data point at 8:30. Graphical representations such as the exemplary FIG. 4 can provide useful information to store owners, for example, regarding the times of day at which customers spend longer periods of time in the store. Such information can help a company accurately plan its staffing to accommodate such customer flow. Other related analytic plots may include graphs displaying average stay times averaged over a period of a week, or month and displayed on a yearlong trend, may also be useful. For example, such a plot may be useful for showing traffic during particular times of year, such as holidays, or specific seasons. Likewise, graphs displaying the mode or median stay times over specified periods may also be generated.

Other types of plots are contemplated, including a scatter plot containing the stay duration for each matched exit image over the course of a predefined time period, such as a day, a week, or a month. Such a scatter plot can also be useful for showing trends; but, unlike the average plot such as FIG. 4, the scatter plot could also show outlier information. In other words, a scatter plot of all stay durations for all matched exit images will show the extremely short stay periods and the extremely long stay periods, which may provide additional useful information.

In one embodiment, average stay time and other stay time analytics may be used to determine flow of traffic through a store. For example, average stay time may be used to estimate the time that a particular entering individual may progress to the checkout location of a store. For example, if the average stay time for individuals in a store at 9:30 AM is twenty minutes, that average can be used to estimate when an individual entering the store at 9:30 may arrive at the checkout counter. In an exemplary embodiment, the average stay time can be used to estimate the time that the entering individual will reach the checkout line by adding the average stay time to the entrance time and subtracting the amount of time that it takes for an individual to pass through the checkout line. For example, if a typical checkout process, including waiting in line and paying for purchased items, takes approximately five minutes, five minutes would be subtracted from the average stay time, and that number would be added to the entrance time to produce the estimated checkout time. The estimation of checkout time can be useful for managing store personnel, especially for determining how much personnel to allocate to checkout. Such prediction would allow a store to determine in advance how to staff its checkout locations.

In another embodiment, checkout time estimation can be enhanced by using a monitoring system to determine the actual current duration of the checkout process. For example the stay time monitor system 1 disclosed in the present application may also be used inside a store to determine current time spent in a checkout process. For example, the presently disclosed system could be used to determine when an individual enters a line and when the individual exits the checkout location, and a match can be made to determine the amount of time that the individual spent in the checkout process. That data can be used by the above-described analytics application to assist in determining an estimated checkout time for an entering individual. In other words, the information regarding the current average time spent in the checkout process can be subtracted from the average stay time to determine the estimated time that the individual will enter the checkout process. In still another embodiment, the entrance traffic can also inform the checkout time estimation calculation. For example, the entrance traffic numbers can be compared to those of an earlier time, or an earlier date to determine whether the calculated average time in the checkout process needs to be adjusted up or down.

Multiple stay time monitoring systems 1 may be utilized in tandem for other purposes as well. For example, time monitoring systems 1 may be implemented throughout sections of a specified area, such as a store, to determine a flow pattern of an individual in that specified area. In such an embodiment, additional cameras can be placed throughout an area, and the images from those cameras can be compared to the entrance images from the first camera to find matches, as well as the images taken by the other cameras inside the specified area. The matched images can then indicate a pattern of where that individual visited during the stay in the specified area. In still another embodiment, time monitoring systems 1 can be nested inside one another, such as in the checkout time monitor application described above. In such an embodiment, images from the first camera of the internal system would be compared to the image from the first camera at the entrance location of the store, for example, and also to the exit images of the internal system. In such an embodiment, it is possible to not only determine a flow pattern of an individual, but how long that individual spent in a specified subsection an area, such as a store.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of monitoring the amount of time spent in a specified area by an individual, the method comprising:
   receiving a plurality of entrance images, each entrance image containing a face of an entering individual that passes a first location;
   storing each entrance image in a database along with a corresponding entrance time that the entering individual passes the entrance location;
   receiving an exit image containing a face of an existing individual that passes a second location:
   storing the exit image along with a corresponding exit time that the exiting individual passes the exit location;
   comparing the exit image to the entrance images in the database:
   identifying a matching entrance image containing the same face as the exit image; and determining a stay time for the exiting individual by determining the difference between the entrance time corresponding to the matching entrance image and the exit time;
   averaging the stay times within the predefined time period to create an average stay time for the predefined time period; and
   determining stay times of multiple exiting individuals over a predefined time period.

2. The method of claim 1, further including a first step of employing a first camera to automatically record an image of a first location; and
   wherein the step of creating the one or more entrance images includes:
     processing the image of the first location with a face detection algorithm to detect a face;
     determining a facial feature descriptor for the detected face using a facial recognition algorithm: and
     generating the entrance image to include the facial feature descriptor.

3. The method of claim 1, further including a first step of employing a first camera to automatically record an image of a second location: and
   wherein the step of creating the one or more exit images includes:
     processing the image of the second location with a face detection algorithm to detect a face;
     determining a facial feature descriptor for the detected face using a facial recognition algorithm; and
     generating the exit image to include the facial feature descriptor.

4. The method of claim 1, further a first step of employing a first camera to automatically record an: image of a first location: and
   wherein the step of creating the one or more entrance images includes:
     processing the image of the first location with a person detection algorithm to detect a person:
     using the person detection algorithm to identify a head area of the detected person in the image of the first location;
     generating an entrance image based on the head area of the detected person.

5. The method of claim 4, further including using a facial feature extractor algorithm to determine a facial feature descriptor for the detected person.

6. The method of claim 1, further comprising creating a graphical depiction of average stay time over time.

7. The method of claim 1 wherein the step of identifying the matching entrance image includes locating an entrance image in the database, if any, that meets at least a predefined commonality threshold with the exit image.

8. A system for monitoring time spent in a location by an individual, the system comprising:
   a first camera positioned to record images of individuals passing a first location:
   a first image processing module configured to:
      process the recorded images from the first camera using a face detection algorithm to detect faces within the recorded image;
      create an entrance image of each detected face; and
      determine an entrance time for each entrance image, wherein the entrance time is the time that the individual in the entrance image passed the first location;
   a database configured to receive and store each entrance image and the corresponding entrance time;
   a second camera positioned to record individuals passing a second location;
   a second image processing module configured to:
      process the recorded images from the second camera using a face detection algorithm to detect faces within the recorded image;
      create an exit image of each detected face; and
      determine an exit time for each exit image, wherein the exit time is the time that the individual in the exit image passed the second location;
   an image matching module configured to compare the exit image to the entrance images in the database using a facial recognition algorithm to identify a matching entrance image containing the same face as the exit image, wherein unmatched entrance images are removed from the database of entrance images after a predefined period of time; and
   a stay time calculator module configured to calculate a stay time for the exiting individual by determining the difference between the entrance time corresponding to the matching entrance image and the exit time.

9. The system of claim 8, wherein the first camera is positioned to record individuals entering a store and the second camera is positioned to record individuals exiting the store: and wherein the stay time for the exiting individual is the time that the exiting individual spent in the store.

10. The system of claim 8, having a centralized image processing module that receives data from both the first camera and the second camera, wherein the first image processing module mid the second image processing module are encompassed in the centralized image processing module.

11. A method of monitoring a time-in-store for an individual, the method comprising:
   recording an image of an entrance location with a first camera;
   recording an entrance time associated with the image of the entrance location:
   detecting one or more faces in the image of the entrance location using a face detection algorithm;
   creating an entrance image of the one or more faces detected in the image of the entrance location:
   storing the entrance image and the entrance time together in an entrance image database;
   recording an image of an exit location with a second camera;
   recording an exit time associated with the image of the exit location; and
   detecting one or more faces in the image of the exit location using the face detection algorithm:
   creating an exit image of the one or more faces detected in the image of the exit location;
   storing the exit image and the exit time together;
   comparing the exit image to images in the entrance image database using a facial recognition algorithm;
   detecting a matching entrance image, wherein the matching entrance image contains a facial match to the exit image;
   calculating a stay time by determining the difference between the exit time and the entrance time associated with the matching entrance image;
   identifying unmatched entrance images in the entrance image database; and
   removing unmatched entrance images from the entrance image database that have entrance times before a predefined time period.

12. The method of claim 11, wherein recording an image of an entrance location includes continuously recording video images of the first location: and
   recording an image of au exit location includes continuously recording video images of the second location.

13. The method of claim 12, further including processing the video images of the first location or the second location to detect changes; and
   wherein the detecting one or more faces in the image of the entrance location includes processing the video images of the first location with the face detection algorithm after detecting a change in the images of the first location, and the detecting one or more faces in the image of the exit location includes processing the video images of the second location with the face detection algorithm after detecting a change in the images of the second location.

14. The method of claim 12, wherein the detecting one or more faces in the image of the entrance location includes continuously processing the video images of the first location and the second location using the face detection algorithm.

15. The method of claim 11, further comprising calculating stay times for multiple matched entrance and exit images over a predefined time period and averaging the stay times within the predefined time period to create an average stay time for the predefined time period.

16. The method of claim 15, further comprising calculating an estimated arrival time at a check-out location for an individual passing an entrance location based on the average stay time.

* * * * *